United States Patent

Mokdad et al.

Patent Number: 5,697,261
Date of Patent: Dec. 16, 1997

[54] DAMPING DEVICE FOR ABSORBING ROTATION SHOCKS, AND A FRICTION CLUTCH INCLUDING SUCH A DEVICE

[75] Inventors: Ayman Mokdad, Saint-Ouen; Didier Duclos, Ozoir-La-Ferriere, both of France

[73] Assignee: Valeo, Paris, France

[21] Appl. No.: 507,309

[22] PCT Filed: Dec. 19, 1994

[86] PCT No.: PCT/FR94/01484

§ 371 Date: Sep. 27, 1995

§ 102(e) Date: Sep. 27, 1995

[87] PCT Pub. No.: WO95/17616

PCT Pub. Date: Jun. 29, 1995

[30] Foreign Application Priority Data

Dec. 23, 1993 [FR] France ............... 93 15579

[51] Int. Cl.[6] ............................................. F16F 15/22
[52] U.S. Cl. ........................ 74/573 R; 192/201; 192/209; 464/3; 464/85
[58] Field of Search ..................... 74/572, 573 R; 192/201, 209, 55.6; 464/3, 85

[56] References Cited

U.S. PATENT DOCUMENTS

| | | | |
|---|---|---|---|
| 1,641,230 | 9/1927 | Manville. | |
| 3,701,403 | 10/1972 | Peterson | 192/55.6 X |
| 4,434,878 | 3/1984 | Okubo | 192/55.6 X |
| 4,500,300 | 2/1985 | Wolf et al. | 464/85 X |
| 4,560,367 | 12/1985 | Wolf et al. | 192/209 X |
| 4,800,996 | 1/1989 | Loizeau | 192/201 |

FOREIGN PATENT DOCUMENTS

| | | |
|---|---|---|
| 0507212 | 10/1992 | European Pat. Off. . |
| 1445551 | 6/1966 | France . |
| 2829644 | 1/1981 | Germany . |
| 2933586 | 1/1981 | Germany . |
| 3243644 | 5/1984 | Germany . |
| 714644 | 9/1954 | United Kingdom . |

Primary Examiner—Charles A. Marmor
Assistant Examiner—Saúl J. Rodríguez
Attorney, Agent, or Firm—Longacre & White

[57] ABSTRACT

A damping device (10) of the type comprising damping means which are disposed between two coaxial rotating inertia parts (12, 14), and which comprise at least one block of elastically deformable material (56A, 58A, 56B, 58B), which is interposed between the two rotating parts (12, 14), and on which there acts a mechanism which comprises a cam (46A, 46B) and a cam follower element (64A, 64B), characterised in that the cam (46A, 46B) is formed on a tilting member (42A, 42B) which is articulated with respect to a first one (12) of the two rotating parts, and in that the cam follower element is a roller (64A, 64B) which is carried by the second rotating mass (14, 66A, 66B), and which cooperates with the cam (46A, 46B) when the two parts (12, 14) rotate with respect to each other.

14 Claims, 4 Drawing Sheets

DAMPING DEVICE FOR ABSORBING ROTATION SHOCKS, AND A FRICTION CLUTCH INCLUDING SUCH A DEVICE

BACKGROUND OF THE INVENTION

1. Field of the Invention

The present invention relates to a damping device for absorbing rotation shocks and for damping vibrations, being of the type comprising damping means which are disposed between two coaxial rotating parts.

The invention is most particularly applicable to a motor vehicle clutch which incorporates an integral damping device, the two rotating parts of which are coupled in rotation, respectively, to the combustion engine of a power unit of the motor vehicle, and to the input shaft of a gearbox of the power unit.

2. Description of the Prior Art

The invention more particularly relates to a damping device of the same type as those which are described and shown in the documents FR-A-1 445 751 and DE-A-3 243 644, which describe and show damping devices of the type in which the damping means comprise at least one block of elastically deformable material which is interposed between the two rotating parts, and on which there acts a mechanism which comprises a cam coupled in rotation to one of the two rotating parts, together with a cam follower element which is coupled in rotation to the other one of the two rotating parts.

In the various examples of design of such a device illustrated in those documents, the block of elastically deformable material consists of a block of natural or synthetic rubber, to which tensile or compressive forces are applied as a function of the relative angular displacement of the two rotating parts.

In one of these cases, a set of rubber rings are provided, which are put into compression. That design does not produce a sufficiently strong damping effect, and it makes it necessary to resort to complementary helical compression springs.

In a second case, the block of elastically deformable material is a block which is adhesively secured between two parallel cylindrical surfaces, one of which is movable and undergoes a tensile force, which is transmitted to the block under the effect of the relative rotation of the two inertia parts. That solution is not entirely satisfactory, in that it does not give a sufficient progressive development of the damping effect, and in that the damping or reaction torque is always substantially proportional to the angle of relative displacement of the inertia masses.

SUMMARY OF THE INVENTION

An object of the present invention is to propose a novel design for a damping device of the type described above, but which is of simple design and which gives a damping effect which is particularly effective and can, in particular, give rise to a damping torque the value of which is not simply proportional to the angle of relative displacement of the two inertia parts.

To this end, the invention proposes a damping device of the type described above, characterised in that the cam is formed on a tilting member, which is articulated on a first one of the two rotating parts about a pivot which is eccentric with respect to the axis of rotation of the two rotating parts, and in that the cam follower element is a roller which is mounted for rotation about an axis carried by the second rotating part, and which cooperates with the cam when one of the two parts rotates with respect to the other in a first direction of rotation.

Thanks to the invention, by comparison with an arrangement using helical springs, it is possible to transmit a lower torque in the slow running mode of the engine, and to transmit a higher torque at the end of the displacement between the two parts. In addition, it is not necessary to provide a special friction device, due to the fact that the damping device includes a block of material which is deformable elastically with intrinsic friction. This block works under favourable conditions.

According to further features of the invention:

the axis of the roller is eccentric with respect to the axis of rotation of the two rotating parts so as to engage, with a clearance, on one of the ends of the cam, starting from the rest position;

the cam is a concavely curved surface portion formed on a surface of the tilting member which faces towards the axis of rotation of the two rotating parts;

the block of elastically deformable material is interposed between the first rotating part and the tilting member;

the block of elastically deformable material is interposed between a concave cylindrical surface portion of the first rotating part and a convex curved surface portion formed on the tilting member;

the concave surface portions and convex surface portions formed on the tilting element are substantially elliptical and parallel;

the concave surface portions and convex surface portions subtend an angle at the centre of substantially 180°;

the block of elastically deformable material is made in two parts arranged on either side of the pivot of the tilting member the two parts of the block of elastically deformable material have different elastic characteristics;

the block of elastically deformable material is a block of elastomeric material secured by adhesive bonding to the said cylindrical concave surface portions of the first rotating part and convex surface portions of the tilting member;

the tilting member includes a fly weight which is adapted to cause it to tilt under the effect of centrifugal force, so as to modify the characteristic curve (transmitted torque versus displacement) of the damping device;

for a rest position of relative angular rotation of the two rotating parts in which the block of elastically deformable material is not under an applied force, the roller is disposed in facing relationship to one of the two opposed end portions of the cam;

the device includes a second roller which is mounted for rotation about an eccentric axis carried by the second rotating part, which, in the said rest position, is disposed in facing relationship with the other one of the two opposed end portions of the cam, and which cooperates with the cam when one of the two rotating parts rotates with respect to the other in a second direction of rotation;

the axes of the two rollers are diametrically opposed;

the device is symmetrical with respect to the axis of rotation of the two rotating parts.

The invention also proposes a motor vehicle friction clutch, characterised in that it includes a damping device made in accordance with the provisions of the invention, with the second rotating part of the damping device constituting, for example, the reaction plate of the clutch with which a friction disc cooperates.

This application is of particular advantage. In this connection, the damping device is part of a damped flywheel system in which the resonant frequency of the system lies below the slow running mode of the engine.

For this reason, and as is described for example in the document FR-A-2 571 461, a torque limiter is provided for absorbing the vibrations that occur on stopping and starting of the engine of the vehicle when passing through the resonant frequency.

In a modification, as described in the document FR-A-2 553 848, it is possible to provide a locking device which is responsive to centrifugal force.

Thanks to the invention, there is no need to provide such costly arrangements, because the damping device enables the vibrations to be absorbed when passing through the resonant frequency.

In addition, there is no need to provide a hysteresis device as in the document FR-A-2 571 461.

It will be noted that it is possible to obtain weaker damping in the slow running mode of the engine, which is very advantageous.

Moreover, there is no need to grease the springs as is usually done for damped flywheels having helical springs.

Furthermore, it is possible to obtain relative angular displacements of increased magnitude between the two rotating parts as compared with a device having helical springs.

Further features and advantages of the invention will appear on a reading of the detailed description which follows, for an understanding of which reference is made to the attached drawings, in which:

DETAILED DESCRIPTION OF THE PREFERRED EMBODIMENT

Figure 1:
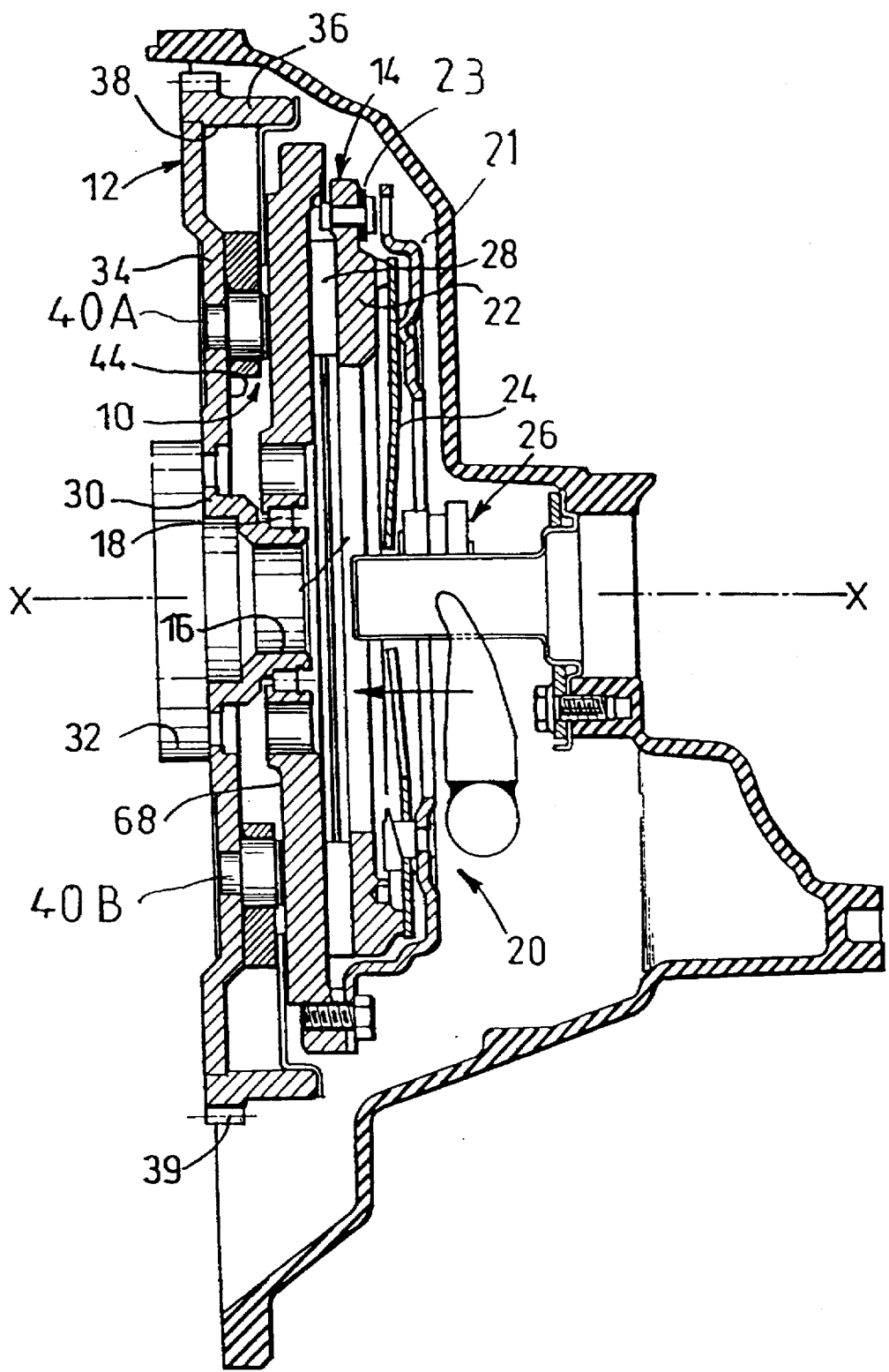
FIG. 1 is a view in axial cross section taken on the line 1—1 in FIG. 2, of one embodiment of a damping device in accordance with the provisions of the invention, which is integrated into the interior of a flywheel of a motor vehicle friction clutch.

FIG. 1 shows a damping device 10 for a motor vehicle, also referred to as damped flywheel, which consists essentially of a first rotating inertia part 12 in the general form of a plate, together with a coaxial second rotating part 14 in the form of a plate, which lie parallel to each other. The two parts thus constitute masses here.

To this end, the second rotating mass 14 is mounted for rotation on a hub 16 of the first rotating mass 12, in this example through a ball bearing 18, so that the two masses 12 and 14 are able to rotate with respect to each other about an axis X—X.

The second rotating mass 14 constitutes the reaction plate of a friction clutch mechanism 20 which is shown diagrammatically, and which comprises a pressure plate 22, a diaphragm 24 which is arranged to be actuated by a clutch release bearing 20, and a cover plate 21.

Thus, by contrast with a conventional arrangement having a flywheel which constitutes the reaction plate of the clutch, in the present case the flywheel is divided into two parts in a manner to be described below.

In the present case, the pressure plate 22 is coupled in rotation to the cover plate 21, with axial mobility in a manner known per se, by means of tangential tongues 23. The diaphragm 24 is mounted on the cover plate 21, for tilting movement thereon, by means of spigot pieces, one of which can be seen in the lower part of FIG. 1. The diaphragm biases the pressure plate 22 towards the reaction plate 14. The friction clutch 20 also includes a friction disc 28 which is coupled to a central hub (not shown), mounted on the input shaft of the gearbox for rotation with it.

The design of the clutch mechanism 20 is conventional, and will not be described here in any greater detail.

It will be recalled that the assembly of the components 21, 22, 23, 24 constitutes a clutch mechanism which is secured on the reaction plate 14 by means of its cover plate 21, in the form of a dished plate. Normally the friction liners that are carried by the disc 28 are gripped under the action of the diaphragm 24 between the plates 14 and 22, so that the clutch is then engaged.

In order to declutch, in this example it is necessary to exert a thrust on the ends of the fingers of the diaphragm 24 by means of the release bearing 26, in order to disengage the clutch.

The first rotating mass 12 is arranged to be connected, in the present case by screwed fastening, through its inner portion 30, to a crankshaft 32 of the internal combustion engine of a motor vehicle, while the second rotating mass 14 is coupled in rotation, through the friction clutch mechanism 20, to the input shaft of the gearbox of the vehicle (not shown).

The first rotating mass 12 consists essentially of a central portion 34 in the form of a face plate or radial plate portion, which is extended at its outer radial edge by an annular cylindrical skirt portion in the form of a crown 36, the outer side of which carries teeth 39 which are arranged to cooperate with the pinion of a starter (not shown), while its concave internal cylindrical surface 38 extends axially, and faces towards the second rotating mass 14. The inner portion 30 of the said plate portion 34 is provided with holes for accommodating fastening screws (not shown), for fastening the plate portion 34 to the crankshaft 32.

Figures 2, 3:
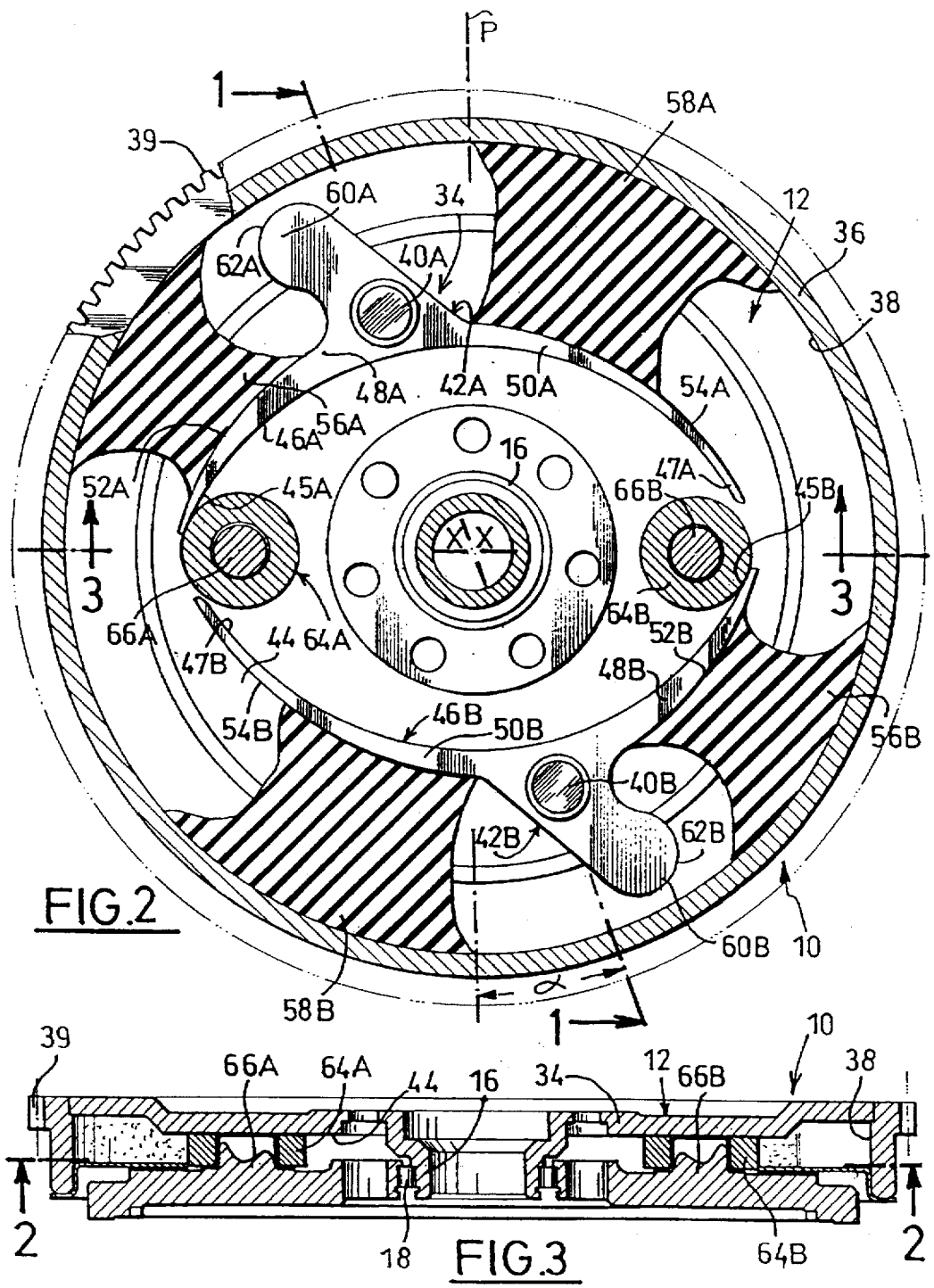
FIG. 2 is a view in cross section taken on the line 2—2 in FIG. 3, which shows some of the components of the damping device, and in particular the first rotating mass equipped with blocks of elastomeric material and tilting members, and in which the rollers that constitute cam follower elements are also shown.
FIG. 3 is a view of the damping device in cross section taken on the line 3—3 in FIG. 2.

As can be gathered from FIGS. 1 to 3, the damping device 10 has a general symmetry of design with respect to the axis X—X.

The central plate portion 34 of the first rotating mass 12 carries two pivots 40A and 40B, which are diametrically opposed to each other, and each of which carries a tilting member 42A, 42B, rotatable thereon.

Each tilting member 42A, 42B is accordingly able to pivot in both directions of rotation about its pivot 40A, 40B against the internal surface 44 of the central plate portion 34 of the first rotating mass 12.

Each tilting member 42A, 42B has an internal profile 46A, 46B in the form of a substantially elliptical, concavely curved cam, the concavity of which faces towards the axis X—X, and which subtends an angle of substantially 180° at the centre.

The cam 46A, 46B extends along two branches 48A-50A, 48B-50B of the tilting member, each of which extends circumferentially on one side of the pivot 40A, 40B, though in this example they are of unequal length.

In this connection, the pivots 40A, 40B are offset circumferentially with respect to the vertical plane P in FIG. 2, by an angle α.

Each of the branches 48A-50A, 48B-50B of the tilting member 42A, 42B defines a convex, elliptical outer surface portion 52A-54A, 52B-54B, which is substantially parallel to the profile of the corresponding cam 46A, 46B, and which lies facing towards the concave cylindrical surface 38 of the first rotating mass 12.

Each tilting member 42A, 42B is coupled to the first rotating mass 12 through a block, of elastomeric material or rubber, which is in two parts 56A-59A, 56B-58B, each of which is adhesively bonded firstly on to the facing surface portion of the cylindrical surface 38 and on the convex and elliptical facing surface portion 52A-54A, 52B-54B. The blocks of resilient material are for example secured by an adhesive, or vulcanised in situ, on the said surface portions.

In the rest position shown in FIGS. 1 to 3, the two-part blocks of elastomeric material are not subjected to any compressive or tensile force.

It will also be noted that the parts 56A and 56B are of smaller dimensions than the parts 58A and 58B, and thus have unequal compressive and tensile elastic characteristics.

Each tilting member 42A, 42B also includes an eccentric projection 60A, 60B, which lies radially outwardly with respect to the level 40A, 40B, and which has a rounded external profile 62A, 62B, and which, for each tilting member 42A, 42B, constitutes a fly weight which is such as to cause the tilting member to pivot under the influence of centrifugal force. It is therefore possible to modify the curve C1 in FIG. 6 as a function of centrifugal force.

The damping device 10 further includes two cam follower rollers 64A and 64B which are arranged eccentrically with respect to the axis X—X, and which are generally diametrically opposed to each other.

Each roller 64A, 64B is mounted for free rotation on a cylindrical projecting element 66A, 66B which projects axially from the surface 68 of the second rotating mass 14 that faces towards the surface 44 of the first rotating mass 12.

In a modification, the rollers 64A, 64B may be of the ball or needle bearing type, being mounted on associated journals carried by the second mass.

In the embodiment shown in the drawings, the projecting elements 66A and 66B, which define pivots, are made integrally by moulding with the second rotating mass 14, typically by casting. This arrangement is particularly inexpensive.

In the rest position shown in FIGS. 1 to 3, each roller 64A, 64B is arranged in facing relationship with a first end portion 45A, 45B of the cam 46A, 46B with which it is in light contact, and in facing relationship with the second end portion 47B, 47A at the other end of the other cam 46B, 46A, with a slight clearance.

The operation of the damping device shown in FIGS. 1 to 3 will now be described with reference, in particular, to FIGS. 4 to 6.

In the interests of simplifying the explanation, it will be assumed that the first rotating mass 12 is fixed, and that it is the second rotating mass 14 that rotates about the axis X—X with respect to the first rotating mass 12, with this rotation taking place in both of the opposed directions of rotation.

Figure 4:
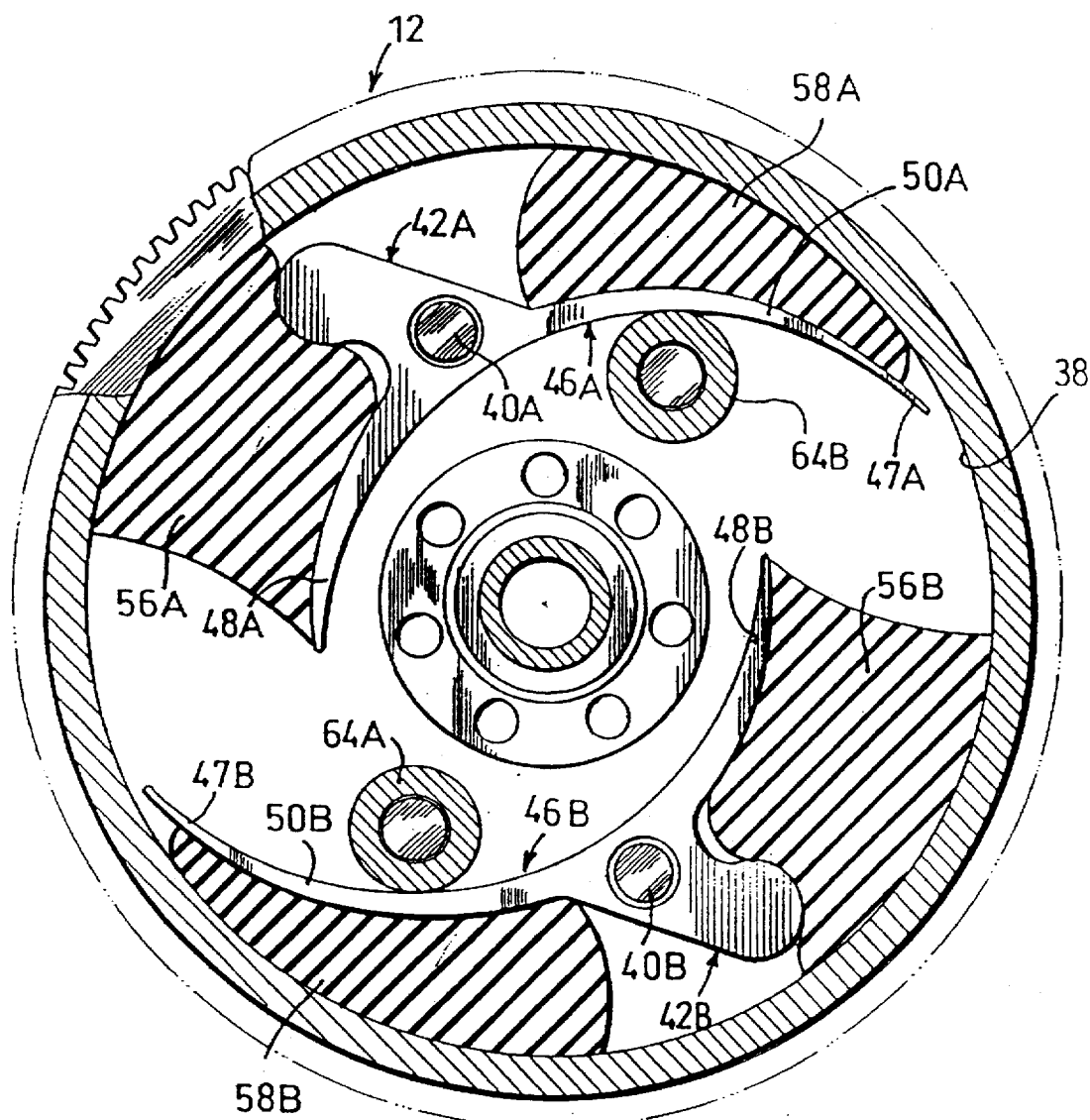
FIG. 4 is a diamgrammatic view, similar to FIG. 2 and showing the relative positions occupied by the various components of the damping device when the two inertia masses are rotating with respect to each other in a first direction of rotation.

Starting at the position shown in FIG. 2, and when the second rotating mass 14 that carries the rollers 64A and 64B rotates in the anti-clockwise direction with respect to FIG. 2, the rollers 64A, 64B cause the tilting members 42A, 42B to deflect simultaneously, each tilting about its pivot 40A, 40B in the anti-clockwise direction with reference to FIGS. 2 and 4.

The relative angular displacement in the anti-clockwise direction, also referred to as the direct sense, may for example reach the value of 60°, shown in FIG. 4.

It is found that the first parts 58A, 58B of the blocks of elastomeric material are compressed by the longer branches 50A, 50B of the tilting members 42A, 42B, while the second parts 56A, 56B of the blocks of elastomeric material are subjected to a tensile force by the shorter branches 48A, 48B of the tilting members 42A, 42B.

In the course of this relative angular displacement, the rollers 64B, 64A cooperate with a first portion of the cams 46A, 46B that extends from the second end 47A, 47B of each cam towards its centre.

Figure 6:
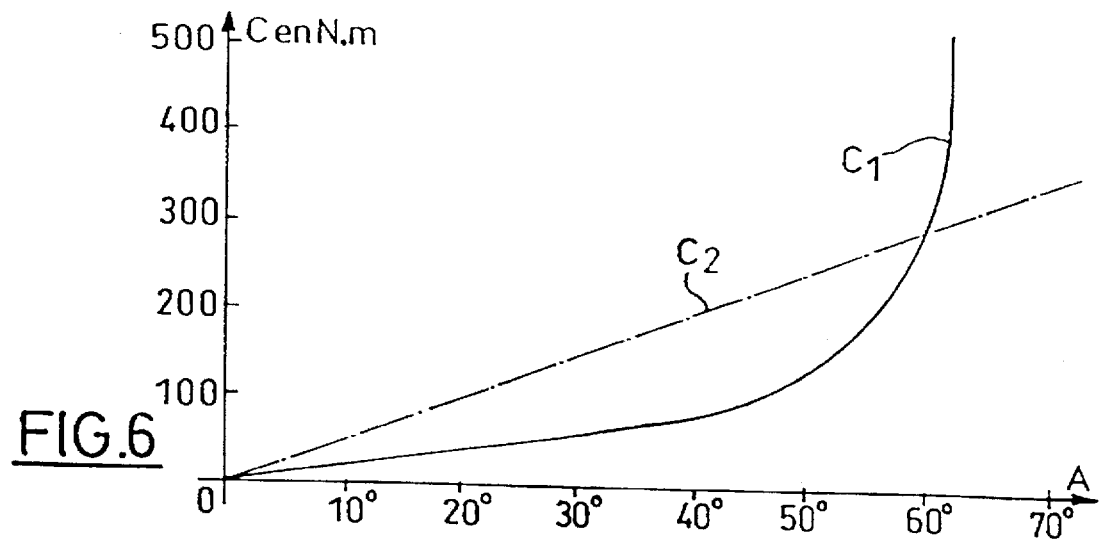
FIG. 6 is a diagram showing the characteristic curve of the reaction torque obtained by the damping device, as a function of the relative angular displacement of the inertia masses.

As a result of the design which, in accordance with the invention, makes use of a tilting member that acts on a block of elastomeric material in two parts which work in compression and in tension, it is possible to obtain a curve C1 for the reaction torque which is obtained by the damping device 10 and which is shown in FIG. 6, which shows that the value of this torque increases substantially exponentially beyond a relative angular displacement greater than 40°, this curve being particularly favourable if it is compared to the straight line C2 which illustrates the value of the reaction torque as a function of the angle of displacement in a device of the prior art, in which the reaction torque varies in direct proportion to the angular displacement, the resilient members being circumferentially acting coil springs.

Thus, by comparing the curves C1 and C2, a weaker damping effect is obtained during the slow running mode of the engine of the vehicle, but a stronger damping effect at the end of the displacement.

In this way, damping of the vibrations in the slow running mode of the engine is improved, and vibrations on stopping and starting of the engine are well damped on passing through the resonant frequency (with large displacements).

Figure 5:
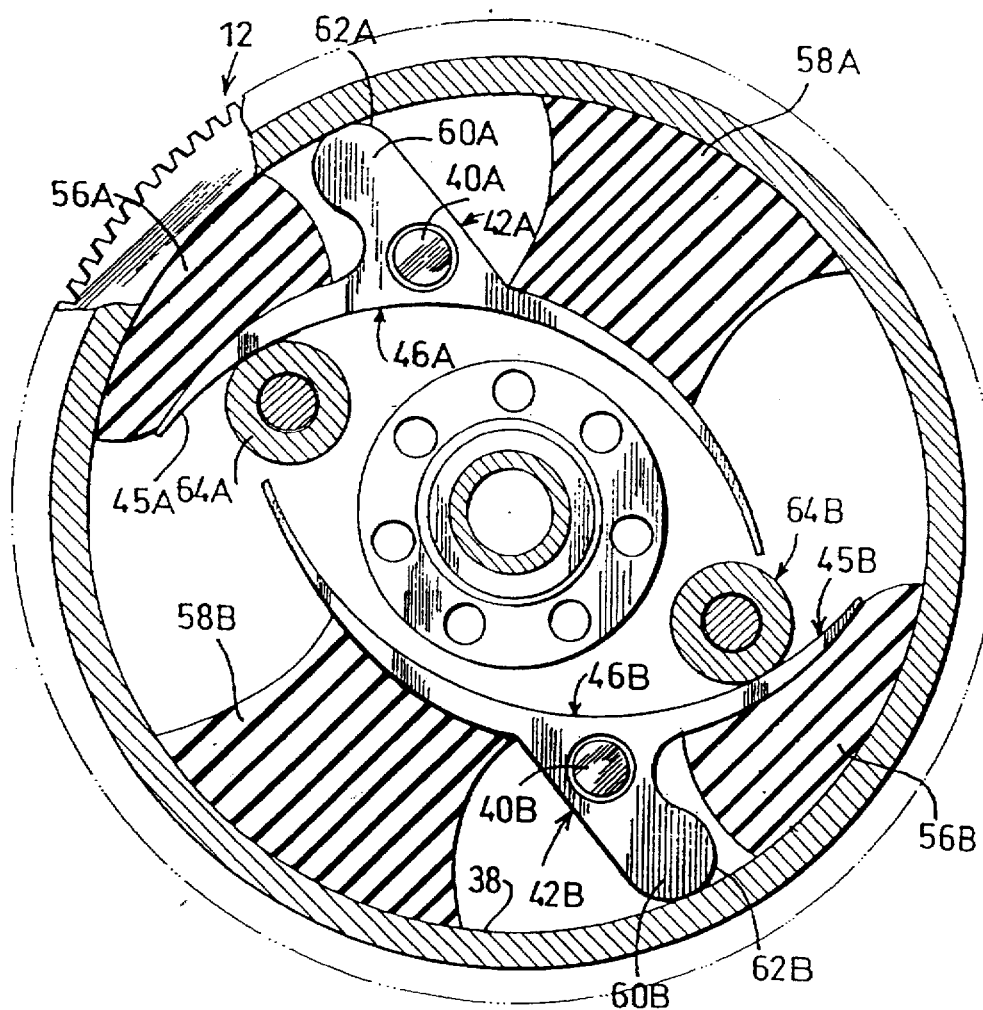
FIG. 5 is a view similar to that in FIG. 4, but corresponding to the other direction of relative displacement of the inertia masses.

When the second rotating mass 14 is in rotation, starting from the rest position shown in FIG. 2 and in the clockwise direction with respect to the rotating mass 12, and as is shown in FIG. 5, the roller 64A, 64B cooperates with the portion of the cam 46A, 46B that extends from the first end 45A, 45B of the latter towards its centre, and this represents a maximum angle of displacement of about 30°, which is illustrated in FIG. 5.

During this relative displacement of the rotating masses 12 and 14, each tilting member 42A, 42B pivots in the anti-clockwise direction, each about its pivot 40A, 40B in the clockwise direction, and this may continue until the curved profile 62A, 62B of the fly weight 60A, 60B makes contact with the internal cylindrical surface 38 of the first rotating mass 12.

During this relative angular displacement, the first parts 56A, 56B of the blocks of elastomeric material are compressed, while the parts 58A, 58B are subjected to a tensile force.

By virtue of the projections 60A, 60B, the curve C1 is displaced towards the left in FIG. 6, as a function of the centrifugal force.

The present invention is of course not limited to the embodiment described. In particular, it is possible to reverse the structures. Thus, the second mass 14 may carry the pivots 40A, 40B and the tilting members 42A, 42B, while the first mass 12 then carries the diametrically opposed rollers 64A, 64B and the projecting elements 66A, 66B. The rollers 64A, 64B may be in contact, in the rest position, with the second end portion 47B, 47A of the other cam 46B, 46A. The invention is applicable to a clutch friction wheel as is described for example in the documents FR-A-1 445 551 and DE-A-3 243 644 mentioned earlier herein.

The rollers may be of the same type as those which are described in the document FR-A-1 445 551, comprising a ring mounted for rotation on an axis carried by the rotating part concerned, with a block of elastic material being interposed between the said ring and a metallic ring which cooperates with the tilting member. In that case, the stiffness of the said block is less than that of the blocks associated with the tilting member, so as to improve absorption of the vibrations when the blocks 56A–58A, 56B–58B are compressed.

Finally, the masses 12, 14 may be mounted for rotation of one with respect to the other through bearing means of the plain bearing type.

We claim:

1. A damping device (10) for absorbing rotation shocks, comprising damping means which are disposed between coaxial rotating parts (12, 14) that are arranged to be coupled in rotation, respectively, to the combustion engine of a motor vehicle power unit, and the input shaft of a gearbox of the power unit, being also of the type in which the damping means comprise at least one block of elastically deformable material (56A, 58A, 56B, 58B), which is interposed between the two rotating parts (12, 14) and on which there acts a mechanism comprising a cam (46A, 46B) which is coupled in rotation to one (12) of the two rotating parts (12, 14), together with a cam follower element (64A, 64B) which is coupled in rotation to one (12) of the two rotating parts (12, 14) wherein, the cam (46A, 46B) is formed on a tilting member (42A, 42B) which is articulated on a first one (12) of the two rotating parts (12, 14) about a pivot (40A, 40B) which is eccentric with respect to the axis (X—X) of rotation of the two rotating parts (12, 14), the cam follower element is a roller (64A, 64B), which is carried by the second rotation part (14A, 66A, 66B) and which cooperates with the cam (46A, 46B) when one of the two parts (12, 14) rotates with respect to the other in a first direction of rotation, the axis (66A, 66B) of the roller (63A, 64B) is eccentric with respect to the axis (X—X) of rotation of the two rotating parts (12, 14) and the tilting member (42A, 42B) includes a flyweight (60A, 60B) which is adapted to cause it to tilt under the effect of centrifugal force.

2. A damping device according to claim 1, wherein the cam (46A, 46B) is a concavely curved surface portion formed on a surface of the tilting member (42A, 42B) which faces towards the axis (X—X) of rotation of the two rotating parts (12, 14).

3. A damping device according to claim 2, wherein the block of elastically deformable material is interposed between the first rotating part (12) and the tilting member (42A, 42B).

4. A damping device according to claim 3, wherein the block of elastically deformable material is interposed between a concave cylindrical surface portion (38) of the first rotating part (12) and a convex curved surface portion formed on the tilting member (42A, 42B).

5. A damping device according to claim 4, wherein the said concave surface portions (46A and 46B) and convex surface portions (52A–54A, 52B–54B) formed on the tilting element (42A, 42B) are substantially elliptical and parallel.

6. A device according to claim 4, wherein the said concave surface portions (46A, 46B) and convex surface portions (52A–54A, 52B–54B) subtend an angle at the centre of substantially 180°.

7. A damping device according to claim 4, wherein the block of elastically deformable material is made in two parts (56A- 58A, 56B–58B) arranged on either side of the pivot (40A, 408) of the tilting member (42A, 42B).

8. A damping device according to claim 7, wherein the two parts (56A–58A, 56B–58B) of the block of elastically deformable material have different elastic characteristics.

9. A damping device according to claim 4, wherein the block of elastically deformable material is a block of elastomeric material secured by adhesive bonding to the said cylindrical concave surface portions (38) of the first rotating part (12) and convex surface portions.(52A–54A, 52B–54B) of the tilting member (42A, 42B).

10. A damping device according to claim 1, wherein, for a rest position of relative angular rotation of the two rotating parts (12, 14) in which the block of elastically deformable material is not under an applied force, the roller (64A, 64B) is disposed in facing relationship to one (45A, 45B) of the two opposed end portions (45A-47A, 45B–47B) of the cam (46A, 46B).

11. A damping device according to claim 1, wherein, it includes a second roller (64B, 64A) which is mounted for rotation about an eccentric axis (66B, 66A) carried by the second rotating part (14), which, in the said rest position, is disposed in facing relationship with the other one (47A, 47B) of the two opposed end portions of the cam (46A, 46B), and which cooperates with the cam (46A, 46B) when one of the two rotating parts (12, 14) rotates with respect to the other in a second direction of rotation.

12. A damping device according to claim 11, wherein, the axes (66A, 66B) of the two rollers (64A, 64B) are diametrically opposed.

13. A damping device according to claim 1, wherein, it, is symmetrical with respect to the axis of rotation of the two rotating parts ( 12, 14).

14. A damping device according to claim 1, wherein, the second rotating part of the damping device (10) constitutes the reaction plate (14) of a friction clutch (20), with which a friction disc (28) cooperates.

* * * * *